“United States Patent  [15] 3,642,367
Ruff  [45] Feb. 15, 1972

[54] MOVIE VIEWING AND STILL COPY CAMERA

[72] Inventor: John Denis Ruff, 206 Birch Street, Alexandria, Va. 22305
[22] Filed: Dec. 19, 1969
[21] Appl. No.: 886,438

[52] U.S. Cl. .................................355/45, 355/66, 355/71
[51] Int. Cl. ..................................................G03b 27/70
[58] Field of Search.................355/45, 44, 18, 55, 66, 67, 355/71, 28; 95/100

[56] References Cited

UNITED STATES PATENTS

| | | | |
|---|---|---|---|
| 2,231,395 | 2/1941 | Schlegel | 355/45 |
| 2,318,616 | 5/1943 | Mayer et al. | 355/44 |
| 2,332,810 | 10/1943 | Place | 355/66 |
| 3,094,035 | 6/1963 | Baasner | 355/45 |
| 2,517,414 | 8/1950 | Pratt et al. | 355/45 |
| 3,240,115 | 3/1966 | Robbins et al. | 355/28 |
| 3,507,590 | 4/1970 | Cerasani | 355/44 |

*Primary Examiner*—Samuel S. Matthews
*Assistant Examiner*—Richard A. Wintercorn

[57] ABSTRACT

A movie-viewing machine with the added feature of being able to expose an enlarged still copy of all, or part of a movie frame, and with a variable degree of enlargement so that the area being copied can be framed suitably on a standard frame of photosensitive material, thus giving a properly framed copy without further enlargement and cropping.

2 Claims, 5 Drawing Figures

PATENTED FEB 15 1972 3,642,367
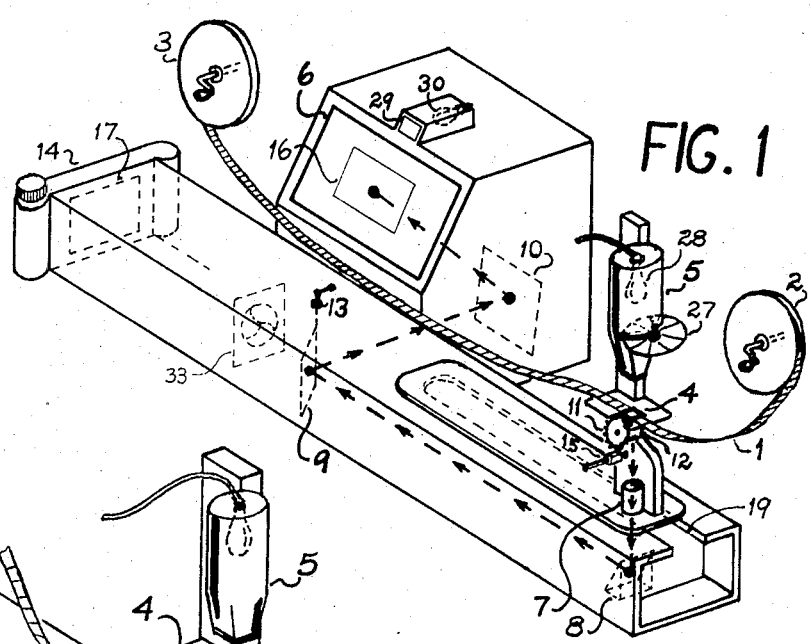
FIG. 1
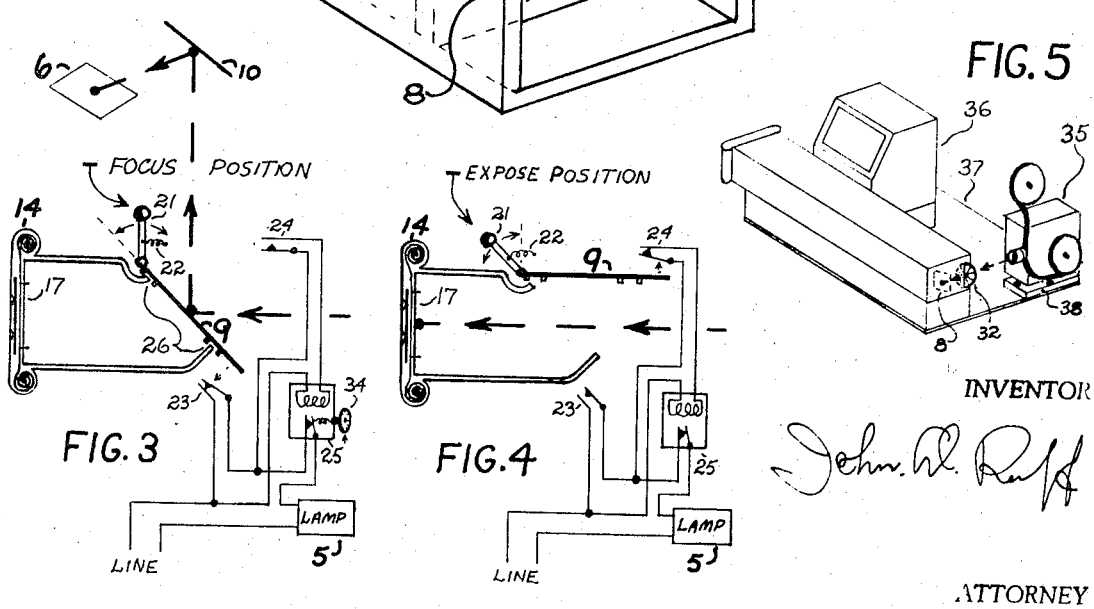
FIG. 2
FIG. 3
FIG. 4
FIG. 5
INVENTOR
John W. Ruff
ATTORNEY

MOVIE VIEWING AND STILL COPY CAMERA

Users of movie equipment often wish to have still copies made from their movie film (either in the form of prints or transparencies). They can cut out the selected frames from their film and have a photofinisher do copies, at a fairly high cost.

Or they can photograph the movie image on a screen with a still camera. However for best results with this method a projector with stop and reverse action is needed and also distortion is caused by having to copy from a side angle. Exposure calculations and focusing also cause problems.

There are also available, special fixed focus cameras which copy full movie frames onto regular roll film, which is then processed as a regular camera film. But this system does not allow part of the frame to be picked out for enlargement (at the time of copying). It is difficult to calculate correct exposure, and selection of the frames to be copied must first be done with the film in a projector or editing machine.

My invention combines a copying camera with a viewing machine (commonly used for editing purposes), so that the user's costs for equipment, materials and services (photofinishing) are at the minimum, while convenience, usefulness and quality of the finished copy are at the maximum. This is because a viewing machine is the most convenient device available to find the pictures most suitable for copying. And a viewing machine adapted for good quality copying and having variable magnification can be produced for a reasonable price. Exposure metering can also be incorporated easily.

Of course the quality of copies taken from 8 mm. movies is not as good as pictures originally photographed on larger frame still cameras, but because of the thousands of frames the user has to choose from, exceptional facial expressions and situations can often be found which make these copies superior in interest value.

My invention comprises:

A basic optical projection system with a gate to hold motion picture film in position for projection, a light source to illuminate the film and a focusable projection lens.

A projection screen on which an enlarged projected image from the motion picture film is displayed.

A system of one or more mirrors mounted between the projection lens and the projection screen, which controls the direction of projection of the image.

A magazine, roll film holder, or any other means of holding photosensitive material, which is in a position so that when one of the control mirrors is moved to an alternate position, the projected image will not reach the projection screen but will be exposed on the film. This arrangement is similar in operation to a single-lens reflex camera.

A system of image deflection combined with a shutter action, of the conventional type used in editing machines, (which is necessary to provide a series of steady images as the movie film is being pulled through the gate) and which is mounted between the gate and the projection lens. However this system is moved out of the optical system when copies are being made so that better image quality can be obtained.

An adjustable mounting for the section of the optical system which holds the light source, film gate, shutter system and projection lens, so that the distance from this section to the projection screen and the film magazine can be varied for the purpose of obtaining a variable degree of enlargement of the projected image.

An exposure control system (for copying) which utilizes a constant exposure time, controlled by a timer switching the light source on and off, and a variable intensity light source. The brightness of the image on the projection screen is manually matched to a constant intensity illuminated spot on or near the screen. Compensation is thus made for light or dense movie frames and for the degree of enlargement (which effects brightness).

In the drawings:

FIG. 1 shows a general layout.

FIG. 2 shows a more detailed view of the lamp, film frame, shutter mechanism and projection lens assembly.

FIGS. 3 and 4 show the alternate positions of the control mirror which converts the system from a function of displaying an image to one of exposing on film.

FIG. 5 shows an alternate projection arrangement.

VIEWING OPERATION

The movie film 1 (FIG. 1) is manually wound from supply reel 2 to takeup reel 3. The film frame in gate 4 is illuminated by light source 5, and an image of this frame is projected on screen 6 by projection lens 7, after being reflected by mirrors 8, 9, and 10. Sprocket holes in film 1 engage in sprocket 11 and rotate it as the film is pulled through. Sprocket 11 rotates shutter and image deflector mechanism 12. This mechanism causes the image, on screen 6, of the movie frame passing through gate 4, to be kept steady though the frame itself is moving. This type of deflector mechanism is conventional in editing machines. As the film is drawn continuously through the gate, a series of images appear on screen 6 and a motion picture is thus presented for viewing.

COPYING OPERATION

While in viewing operation a certain frame can be selected for copying and this frame is left in position in gate 4. Basically the copying is achieved by turning mirror 9 on its pivot 13 so that it will not reflect the projected image onto mirror 10 and screen 6, but it will then allow the image to be projected onto the photosensitive material in magazine 14. This magazine can contain roll-film, film-pack, "Polaroid" film or any other photosensitive material. The movement of mirror 9 is similar to the movement of the mirror in a single-lens reflex camera.

A detailed description of copying operation follows:

Framing

With the frame selected for copying in position in gate 4 (FIG. 1) and with light source 5 turned on, and with mirror 9 in the focusing position (see FIG. 3), an image of the frame is projected on screen 6. However the shutter and deflector mechanism 12 (FIG. 1) causes some loss of image quality due to chromatic refraction. So, while copying, mechanism 12 (with sprocket 11 attached) is moved along slide 15 (FIG. 2) so that it is removed from the optical system. Screen 6 (FIG. 1) has a set of marking lines on it, and the area encompassed by these lines, 16, corresponds to the area of photosensitive material, 17, to be exposed in magazine 14. That is, whatever image is encompassed in area 16 will ultimately be exposed on photosensitive material 17. By moving the movie frame in gate 4, a desired section of the whole frame can be picked out and lined up in area 16. Movement of the film frame can be in the direction of the length of the film, sideways, or as shown in FIG. 2, it can be turned through 90° when it is desirable to accommodate the subject lengthwise in a rectangular copy. A pressure pad 18 (FIG. 2) holds the film in place (and can be swung out of the way in viewing operation).

Focusing

FIG. 2 shows how light source 5, gate 4, shutter 12, projection lens 7 and mirror 8 are mounted in one assembly which can be moved along bed 19 so that the distance between mirrors 8 and 9 can be variable. In this way the degree of enlargement is variable. When used in viewing operation the movement is fully extended. That is, the distance between mirrors 8 and 9 is at the maximum and the projected image fills screen 6 (FIG. 1). Projection lens 12 is focused (in relation to its distance from frame 4) with adjustment 20 (FIG. 2). The fully extended position of the projection assembly movement is also used for copying operations where only the smallest part of the frame is to be copied. However when all of the frame is to be included in the copy, the movement is retracted; that is the distance between mirrors 8 and 9 is reduced till all the image of the frame is included in area 16 (FIG. 1). The lens 7 is refocussed for this new setting. Of course intermediate degrees of enlargement can be used as desired. A variable degree of enlargement can also be obtained with a zoom projection lens, in which case movement of the projection assembly is not necessary. A projection lens system commonly referred to as a "zoom" lens comprises a number of lens elements which are movable in relation to each other (along the axis of projection). And by moving these elements the focal length of the lens system can be varied, and thus the degree of enlargement of the projected image can be varied without changing the distance between the lens system and the projection screen or the photosensitive material.

Exposing

When the image to be exposed is properly framed and focused on screen 6, it is ready for exposing onto the film in magazine 14 (FIG. 1). First the light source 5 is turned off. FIGS. 3 and 4 show how mirror 9 is then turned, by handle 21, to the exposing position where it is out of the path of image projection, (as shown in FIG. 4). The image projection will thus be allowed to fall directly on the film in magazine 14. The light source is then turned on for the exposure time and the copy is exposed. Handle 21 is released and spring 22 returns mirror 9 to the focusing position (FIG. 3). A refinement is the use of switch 23 (see FIGS. 3,4) which controls the light source. That is, while mirror 9 is in the focusing position, switch 23 is kept made, by pressure from mirror 9, and keeps the light source turned on. But when mirror 9 is moved, the light source is automatically turned off. Then, when mirror 9 is moved farther, into the expose position, it actuates switch 24 which starts the exposure, through timer 25. In this way the only movement necessary to make an exposure is to turn handle 21. After the exposure is made another frame can be selected and focused, the film in magazine 14 wound on, and the next exposure made. FIG. 3 shows how the back of the mirror 9 forms a light trap 26, which prevents stray light from reaching the photosensitive material 17 during focusing (or viewing) operation. This light trap is placed around the perimeter of the back of mirror 9.

Exposure Control

Exposure timer 25 provides a constant exposure time. However different densities of film being copied, and variations in the degree of enlargement cause variations in brightness of the projected image. For the purpose of maintaining a constant brightness of the projected image a variable density-extinction-type filter (27 in FIG. 1) is used in light source 5. This filter is made of transparent, heat resistant material. It is circular and has a pivot in the center. Its area is divided into segments. One segment is completely transparent. The adjoining one is slightly extinctive, and the others are progressively more extinctive. This filter is mounted so that a segment is in the path of the light travelling from the bulb 28 toward the film gate 4. By turning the filter 27 on its pivot the intensity of light reaching the film gate can be varied. Adjacent to screen 6 (FIG. 1) is a small section of similar screen, 29. This screen is illuminated by bulb 30 and its brightness is constant. To set for correct exposure, (after the selected frame is lined up and focused), filter 27 is turned till the average brightness of the image on screen 6 is equal to the brightness of screen 29. Other methods of controlling the output of light source 5, such as varying lamp voltage, varying the distance between the lamp and the film gate, a variable aperture device in the lamp condenser system, and other conventional methods can alternately be used.

An alternate method of controlling image brightness is the use of a variable aperture (31 in FIG. 2) in the projection lens. This aperture device would replace filter 27 and would be used in a similar manner to match the brightness of screen 6 to the brightness of screen 29. Another alternate method is the use of a variable density filter (similar to filter 27) in other parts of the optical system where it would control image brightness. Possible locations are between frame 4 and deflector 12, between deflector 12 and lens 7, between lens 7 and mirror 8, and between mirror 8 and mirror 9. FIG. 2 shows such a filter 32, between lens 7 and mirror 8.

An alternate method of providing a constant exposure time is the use of shutter 33 (in FIG. 1) which opens for a constant time to control exposure. With this method, light source 5 runs continuously, and timer 25 is not used.

Speed of Photosensitive Material

The above exposure control methods assume a constant sensitivity of the copy film, and this would generally be the case since the popular usage of this invention would seem to be for making print copies with negative color or black and white film, and similar speed films of these types are available. However if a further selective control of exposure is required, to compensate for the various speeds encountered with "Polaroid" (color and black and white), and "Kodachrome" materials, then the speed of exposure timer 25 (FIG. 3) could be made variable and its controlling device 34, calibrated directly in film speeds. Shutter 33 also can be made variable in speed for this purpose.

Projector Accessory

In describing how the basic optical system (light source, film gate and projection lens) of a viewing machine can be combined with additional devices to provide the additional function of a copy camera, I have been primarily concerned with the type of machine commonly used for editing. However a movie projector (with still frame projection feature) can also have its basic elements (light source, film gate and projection lens) combined with accessory devices to constitute a similar type of combination viewing and copying machine. An example of this arrangement would be if film reels 2,3, gate 4, light source 5, lens 7 and deflector mechanism 12 were removed from the system previously described herein and replaced so by a projector. FIG. 5 shows such an arrangement, with projector 35 and viewing and copying accessory 36 mounted on a common base 37. Mirror 8 and filter 32 are now aligned horizontally; otherwise copy accessory 36 is similar to the system shown in FIG. 1 (without the projection assembly). Variations of the degree of enlargement can be obtained by sliding the projector nearer or further from the copying accessory. And lining up of the projected images (to pick out a desired part of the image for copying), can be achieved by a combination movement of sliding the projector 35 sideways on base 37 and a vertical movement of the projector by elevator platform 38. Exposing procedures are similar to those already described.

I claim:

1. I claim, in combination, a photographic device comprising means of holding a reel of processed motion picture film so that the reel can be free to turn on its axis as the film is drawn off from it and a means of propelling the film thus from the reel and through the projection gate of an optical projection system so that each of the movie frames on it is drawn successively through the said projection gate, and the said projection system comprising essentially a light source means of causing light rays to flow through the said frames in the said projection gate and to a projection lens system means of organizing the said light rays into an image projection to travel away from the said projection gate and in the general direction along a primary axis of projection and to a movable means of diverting the said image projection into a secondary axis of projection of light rays leaving the said means of diverting, and a means of moving the said movable means of diverting selectively into either a viewing position or an exposing position, and means, employed in the said viewing position, of projecting the said image projection on a viewing screen to form enlarged images of the picture images on the said movie frames, and means, employed in the said exposing position, of projecting the said image projection on uniform sized sections of photosensitive material to expose enlarged latent images of the picture images on the said movie frames onto this material, and the said viewing screen having a defined area of its surface which is aligned in such a manner that whatever part of the projected image is displayed in this defined area at the time the said movable means of diverting is in the said viewing position, then this same said part of the projected image is caused to exactly cover one of the said uniform sized sections of the said photosensitive material at the time the said movable means of diverting is moved to the said exposing position, provided that the said motion picture film is in the same position in the projection gate during both the viewing and exposing positions of the said movable means of diverting, and means of selectively altering the distance of the said projection lens system means from the said means of diverting while keeping the said projection lens system means in the said primary axis of projection, and means of selectively altering the distance of the said projection gate and the said light source means, from the said projection lens system means, so that by these means of selectively altering the relative positions of the means of diverting, the projection lens system means, and the projection gate and light source, the degree of enlargement of the said enlarged images can be selectively varied, and incorporated into the said optical projection system a means of deflecting the said image projection so that while the said movable means of diverting is in its said viewing position, and while a frame of the said motion picture film is being moved through the said projection gate, a steady unmoving enlarged image of the picture image on the said frame is projected on the said viewing screen, and a sprocket, the teeth of which engage in the said motion picture film, so that as the said frame of the said motion picture film is being drawn through the said projection gate the said sprocket is caused to turn and the said sprocket is attached to the said means of deflecting in such a manner that a turning motion of the said sprocket causes the said means of deflecting to operate and thus the movement of the said frame through the said gate causes the matching operation of the said means of deflecting, and means of mounting the said means of deflecting and the said sprocket so that they can selectively be removed from contact with, or engaged with, the said motion picture film while still remaining attached to the said photographic device, and the said projection gate being constructed in such a manner that a selected movie frame in it can be selectively moved to that any part of the said selected movie frame can be centered in the said projection gate, and a means of selectively holding the said selected film frame securely in position when a selected part of the said selected film frame has been centered in the said projection gate.

2. I claim, in combination, a photographic device comprising means of holding a reel of processed motion picture film so that the reel can be free to turn on its axis as the film is drawn off from it and a means of propelling the film thus from the reel and through the projection gate of an optical projection system so that each of the movie frames on it is drawn successively through the said projection gate, and the said projection system comprising essentially a light source means of causing light rays to flow through the said frames in the said projection gate and to a projection lens system means of organizing the said light rays into an image projection to travel away from the said projection gate and in the general direction along a primary axis of projection and to a movable means of diverting the said image projection into a secondary axis of projection of light rays leaving the said means of diverting, and a means of moving the said movable means of diverting selectively into either a viewing position or an exposing position, and means, employed in the said viewing position, of projecting the said image projection on a viewing screen to form enlarged images of the picture images on the said movie frames, and means, employed in the said exposing position, of projecting the said image projection on uniform sized sections of photosensitive material to expose enlarged latent images of the picture images on the said movie frames onto this material, and the said viewing screen having a defined area of its surface which is aligned in such a manner that whatever part of the projected image is displayed in this defined area at the time the said movable means of diverting is in the said viewing position, then this same said part of the projected image is caused to exactly cover one of the said uniform sized sections of the said photosensitive material at the time the said movable means of diverting is moved to the said exposing position, provided that the said motion picture film remains in the same position in the projection gate during both the viewing and exposing positions of the said movable means of diverting, and the said projection lens system means including a plurality of optical elements which are movable in relation to each other along the primary axis of projection so that the focal length of the said projection lens system means can be varied, and this said projection lens system means including the said optical elements comprising what is commonly referred to as a zoom lens, and this said zoom lens being a means of selectively varying the degree of enlargement of the said enlarged images, and incorporated into the said optical projection system a means of deflecting the said image projection system so that while the said movable means of diverting is in its said viewing position, and while a frame of the said motion picture film is being moved through the said projection gate, a steady unmoving enlarged image of the picture image on the said frame is projected on the said viewing screen, and a sprocket, the teeth of which engage in the said motion picture film, so that as the said frame of the said motion picture film is being drawn through the said projection gate the said sprocket is caused to turn and the said sprocket is attached to the said means of deflecting in such a manner that a turning motion of the said sprocket causes the said means of deflecting to operate and thus the movement of the said frame through the said gate causes the matching operation of the said means of deflecting, and means of mounting the said means of deflecting and the said sprocket so that they can selectively be removed from contact with, or engaged with, the said motion picture film while still remaining attached to the said photographic device, and the said projection gate being constructed in such a manner that a selected movie frame in it can be selectively moved so that any part of the said selected movie frame can be centered in the said projection gate, and a means of selectively holding the said selected film frame securely in position when a selected part of the said selected film frame has been centered in the said projection gate.

\* \* \* \* \*